(12) United States Patent
Kojima

(10) Patent No.: US 7,847,488 B2
(45) Date of Patent: Dec. 7, 2010

(54) POWER SUPPLY CIRCUIT AND PORTABLE DEVICE

(75) Inventor: Hidekazu Kojima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 779 days.

(21) Appl. No.: 11/576,076

(22) PCT Filed: Feb. 7, 2006

(86) PCT No.: PCT/JP2006/302411

§ 371 (c)(1),
(2), (4) Date: Mar. 27, 2007

(87) PCT Pub. No.: WO2006/085632

PCT Pub. Date: Aug. 17, 2006

(65) Prior Publication Data

US 2009/0200956 A1 Aug. 13, 2009

(30) Foreign Application Priority Data

Feb. 8, 2005 (JP) .............................. 2005-031718

(51) Int. Cl.
H05B 41/36 (2006.01)
(52) U.S. Cl. .................................................. 315/291
(58) Field of Classification Search ................. 315/291, 315/307, 209 R; 323/280, 281, 282
See application file for complete search history.

(56) References Cited

U.S. PATENT DOCUMENTS 6,798,274 B2   9/2004  Tanimoto
7,292,462 B2 * 11/2007 Watanabe et al. ............. 363/60
2005/0007186 A1  1/2005 Kamijo
2005/0046280 A1 * 3/2005 Itabashi et al. .............. 307/131
2005/0099329 A1 * 5/2005 Kawata ...................... 341/158
2005/0174098 A1 * 8/2005 Watanabe et al. ........... 323/282

FOREIGN PATENT DOCUMENTS

| JP | 2000-305531 A | 11/2000 |
|---|---|---|
| JP | 305531 | * 11/2000 |
| JP | 2001-157438 A | 6/2001 |
| JP | 2002-272091 A | 9/2002 |
| JP | 272091 | * 9/2002 |
| JP | 2003-88103 A | 3/2003 |
| JP | 88103 | * 3/2003 |
| JP | 2003-289663 A | 10/2003 |
| JP | 2005-12944 A | 1/2005 |

OTHER PUBLICATIONS

Official Communication for PCT Application No. PCT/JP2006/302411; mailed Apr. 4, 2006.

* cited by examiner

Primary Examiner—Douglas W Owens
Assistant Examiner—Minh D A
(74) Attorney, Agent, or Firm—Keating & Bennett, LLP

(57) ABSTRACT

A power supply circuit has a charge pump (CHP) step-up circuit including multiple CHP units for stepping up a given power supply voltage to a step-up voltage higher than the power supply voltage, and, based on an output voltage setting signal, converts the step-up voltage to a required output voltage. A comparator compares the detection voltage associated with the output voltage with a reference voltage to generate a comparison signal. In supplying a required output voltage, the number of operable CHP units can be changed to control the step-up voltage based on the comparison signal.

17 Claims, 4 Drawing Sheets

POWER SUPPLY CIRCUIT AND PORTABLE DEVICE

BACKGROUND OF THE INVENTION

1. Field of the Invention

This invention relates to a power supply circuit utilizing a charge pump (CHP) type step-up circuit and to a portable device equipped with such power supply circuit and a load circuit such as an LCD driver circuit.

2. Description of the Related Art

CHP type step-up circuits have been used in many of conventional power supply circuits to generate a higher voltage than a power supply voltage.

In general, a CHP step-up circuit has multi-stage CHP units configured to step up an inputted power supply voltage to a desired step-up voltage. Japanese Patent Applications Laid Open No. 2001-157438 (referred to as Patent Document 1) and No. 2003-289663 (referred to as Patent Document 2) disclose CHP step-up circuits having multi-stage CHP units for stepping up an inputted power supply voltages to a desired step-up voltage wherein the number of operable stages of the CHP units is changed based on the detected level of output current and/or the step-up voltage. That is, the CHP step-up circuit is adapted to generate a desired step-up voltage in response to a change in the power supply voltage.

Incidentally, in utilizing a CHP step-up circuit as a power supply circuit for driving a load circuit such as an LCD driver circuit, an output voltage generation circuit is often used to convert the step-up voltage to a predetermined output voltage (namely, internal voltage) of the load circuit. However, when a power supply circuit that includes such a CHP step-up circuit and an output voltage generation circuit as stated above is formed in one IC chip along with a load circuit such as an LCD driver circuit, no means is provided for controlling the step-up voltage in response to an internal voltage.

In the case of an LCD, voltage correction for fine adjustment of colors and, above all, voltage correction to compensate for temperature changes of the IC chip are required. However, the methods taught in the above-mentioned Patent Documents 1 and 2 are not satisfactory for these purposes.

SUMMARY OF THE INVENTION

It is, therefore, an object of the invention to provide a power supply circuit having a CHP step-up circuit for stepping up a given power supply voltage to a step-up voltage and an output voltage generation circuit for converting the step-up voltage to a required output voltage to be supplied to a load circuit, the power supply circuit capable of: controlling the step-up voltage based on the level of the output voltage; and finely controlling the level of the output voltage in response to a control signal associated with an internal signal received from the load circuit.

It is another object of the invention to provide an easy-to-see and long-operable portable device equipped with an inventive power supply circuit as described above and a load circuit such as an LCD driver circuit.

A power supply circuit in accordance with one aspect of the invention comprises: a CHP step-up circuit having multiple stages of CHP units including a first through a last CHP units and adapted to step up an inputted power supply voltage to a higher step-up voltage; an output voltage generation circuit for converting the step-up voltage to a required output voltage based on an output voltage setting signal; a voltage comparison circuit having at least one comparator for comparing the detection voltage associated with the output voltage with a reference voltage to generate a comparison signal; and a switchable control circuit for controlling the number of operable stages of the multiple CHP units based on the comparison signal.

The switchable control circuit may be configured to stop one or more of the multiple CHP units in sequence starting from the first CHP unit in accordance with the comparison signal to thereby control the step-up voltage.

The switchable control circuit may be configured to stop one or more of the multiple CHP units in sequence starting from the last CHP unit in accordance with the comparison signal to thereby control the step-up voltage.

The output voltage generation circuit may have: an output voltage setting circuit, operable at the step-up voltage, for generating an output reference voltage in accordance with the output voltage setting signal; and a buffer amplifier, operable at the step-up voltage, for amplifying the output reference voltage to the output voltage.

The power supply circuit may be formed in an IC chip, and the output voltage setting circuit may be adapted to correct the output reference voltage according to the temperature of the IC chip.

The power supply circuit may be formed in an IC chip, and the output voltage setting signal may be corrected according to the temperature of the IC chip and/or the temperature of the display driven by the driving voltage associated with the output voltage.

Each of the CHP units may have: a first switching circuit provided between the input and the output ends of the unit; a flying capacitor connected at one end thereof to the output end; and a change-over switching circuit having a first end connected to a node of a reference voltage, a second end connected to a node of the power supply voltage, and a common end connected to the other end of the flying capacitor, the change-over switching circuit controlled by the same CHP control signal as controlling the first switching circuit.

The switchable control circuit may be supplied with the comparison signal and a clock, and provides a CHP control signal that varies in synchronism with the clock to those CHP units to be operated and another CHP control signal having a predetermined (fixed) level to those CHP units to be stopped.

A portable device in accordance with another aspect of the invention comprises: a battery power supply; an inventive power supply circuit as described above and supplied with the power supply voltage of the battery power source; and a load circuit receiving the output voltage of the power supply circuit.

According to the present invention, a step-up voltage obtained by a CHP step-up circuit can be converted by an output voltage generation circuit to a desired output voltage for use as the driving voltage for driving a load circuit such as an LCD drive circuit. The level of the step-up voltage can be automatically controlled to provide the desired output voltage. Such load circuit is not limited to an LCD drive circuit. It encompasses a load circuit that requires multiple different voltages and a load circuit whose load varies greatly that it may cause the power supply voltage to change. It is noted that in the invention a desired output voltage can be generated by simply supplying an output voltage setting signal to the output voltage generation circuit. Thus, an optimal step-up voltage for generating a required output voltage is automatically provided to the output voltage generation circuit, which facilitates reduction of the electric power loss in the power supply circuit and hence improvement of the efficiency thereof.

It is also noted that in the invention the output voltage can be finely corrected or controlled in response to the temperature change of the IC chip that accommodates the power supply circuit and the temperature change of a display driven by the output voltage supplied from the power supply circuit.

It will be recalled that in order to control the step-up voltage of an inventive multi-stage CHP step-up circuit, one or more of the first through the last CHP units can be stopped in sequence starting from the first or the last CHP unit in response to a comparison signal. In this case, operable CHP units are supplied with a CHP control signal that varies in synchronism with a clock, while those CHP units to be stopped are provided with a CHP control signal of a predetermined level. Thus, no switching operation is performed in the stopped CHP units, resulting in no switching power loss, thereby further improving the efficiency of the circuit. As a result, a battery-powered portable device utilizing an inventive power supply circuit can have an extended operating time.

An external controller (such as a CPU) for controlling the power supply circuit of the invention is only required to provide an output voltage setting signal associated with the required output voltage for the load circuit such as an LCD drive circuit, the burden of controlling the power supply circuit on the controller is light. Thus, much of the control capability of the controller (e.g. CPU) can be diverted to other purposes.

Other features, elements, steps, advantages and characteristics of the present invention will become more apparent from the following detailed description of preferred embodiments thereof with reference to the attached drawings.

DETAILED DESCRIPTION OF PREFERRED EMBODIMENTS

Figure 1:
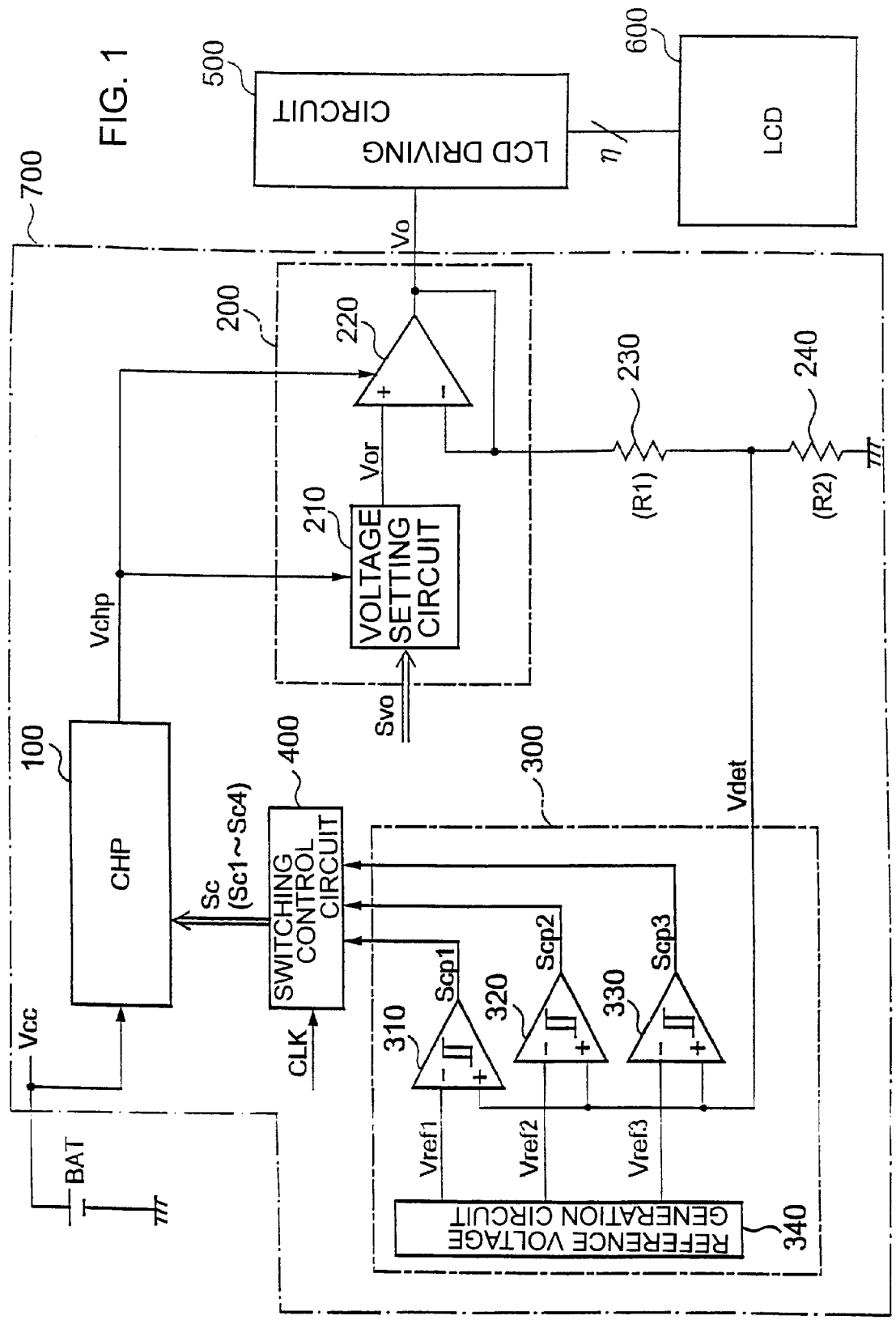
FIG. 1 shows arrangements of a power supply circuit and a portable device equipped with an LCD in accordance with one embodiment of the invention.
Figure 2:
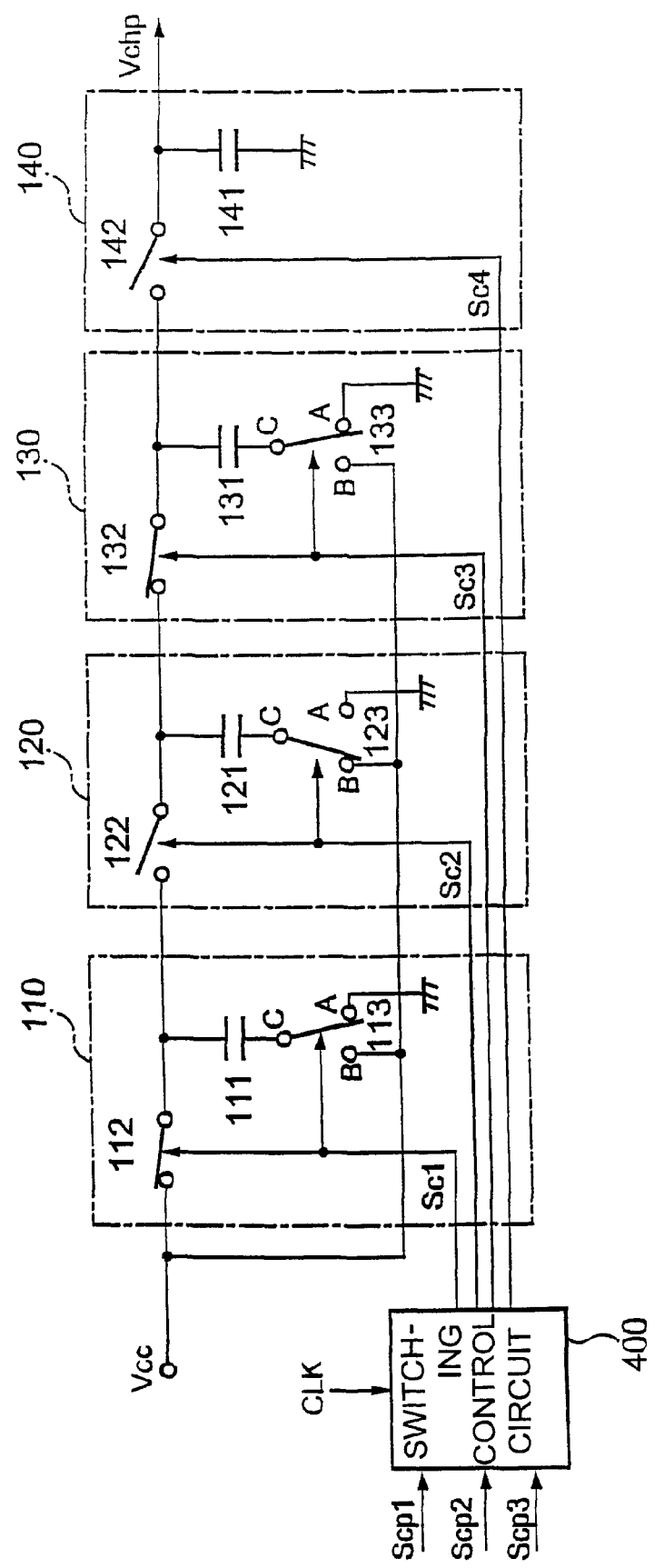
FIG. 2 shows an exemplary circuit arrangement of the CHP step-up circuit of FIG. 1.
Figure 3:
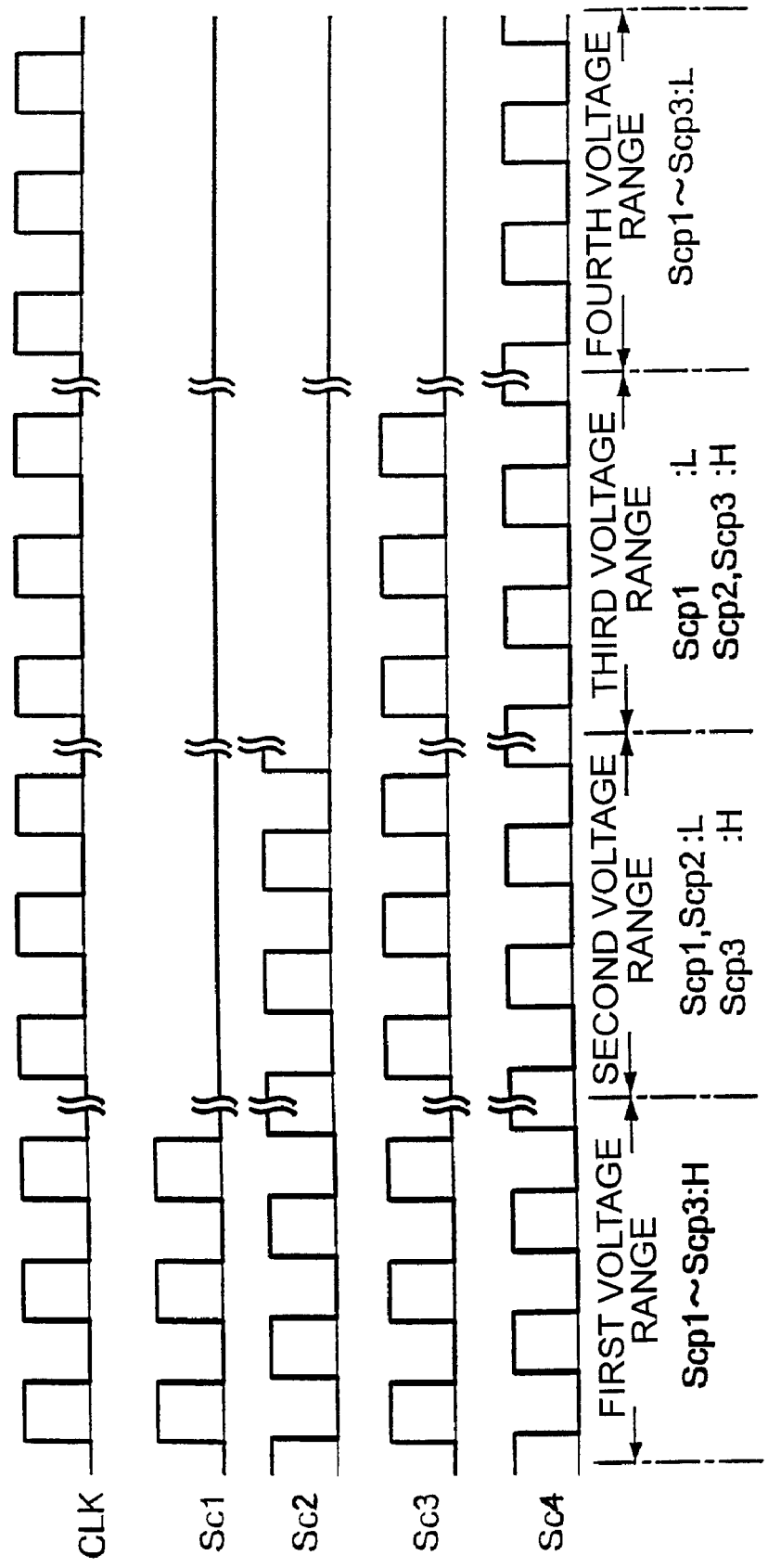
FIG. 3 shows a timing diagram depicting operation of the power supply circuit of FIG. 1.

Referring to FIGS. 1 through 3, the invention will now be described in detail with particular reference to preferred embodiments of a power supply circuit utilizing a CHP step-up circuit and of portable devices equipped with an inventive power supply circuit and a load circuit. In the examples shown, the load circuit will be assumed to be an LCD driver circuit 500, to which an LCD 600 is connected to receive therefrom n different driving voltages (with $n \geq 2$, for example).

Referring to FIG. 1, there is shown an arrangement of a power supply circuit 700 utilizing a CHP step-up circuit 100 in accordance with a first embodiment of the invention. There is also shown in FIG. 1 an arrangement of a portable device equipped with a battery BAT, the power supply circuit 700, the LCD driver circuit 500, and the liquid-crystal-display (LCD) panel 600. The power supply circuit is formed in one IC chip, possibly with the LCD driver circuit adapted to receive the output voltage of the power supply circuit. The LCD panel may be provided outside the IC chip.

As seen in FIG. 1, the CHP step-up circuit 100 has multiple stages of CHP step-up units (first through last stage CHP units). The circuit 100 receives CHP control signals Sc1 through Sc4 (which are collectively denoted by Sc) to step up an inputted power supply voltage Vcc to a higher step-up voltage Vchp.

Based on an output voltage setting signal Svo, an output voltage generation circuit 200 converts the step-up voltage Vchp to an output voltage Vo that can take on different values. The output voltage Vo is supplied to the load circuit (LCD drive circuit) 500, which requires different levels of driving voltage. The load circuit, however, is not limited to the LCD drive circuit 500. It can be any circuit requiring different voltages. When the LCD drive circuit 500 is formed in one IC chip together with the CHP step-up circuit 100 and the output voltage generation circuit 200, the output voltage Vo can be the as internal voltage of the IC chip.

The output voltage generation circuit 200 includes an output voltage setting circuit 210 that operates at the step-up voltage Vchp and generates an output reference voltage Vor in accordance with an output voltage setting signal Svo, and a buffer amplifier 220 that operates at the step-up voltage Vchp upon receipt of the output reference voltage from the output voltage setting circuit 210 to amplify the output voltage setting signal Svo to the output voltage Vo.

The output voltage setting signal Svo is an externally supplied signal that can be set to an arbitrary level according to the driving condition of the LCD drive circuit 500. It can be supplied from an external CPU, for example.

The level of this output reference voltage Vor is preferably corrected according to the temperature of the IC chip incorporating the power supply circuit and the temperature of the liquid crystal display 600. To do so, the temperatures of the output voltage generation circuit 200 in the IC, the LCD drive circuit 500, and the liquid crystal display 600 are detected. Based on these temperatures detected, the output voltage setting signal Svo is corrected before it is supplied to the output voltage setting circuit 210.

Any amplifier that can provide the output voltage Vo based on the output reference voltage Vor can be used as the buffer amplifier 220. A voltage follower for example is suitable for this purpose.

The step-up voltage Vchp supplied to the output voltage setting circuit 210 and the buffer amplifier 220 can be of any level so long as it is larger than the minimum level necessary for these circuits to generate the output reference voltage Vor and the output voltage Vo, respectively. Any superfluous component of the step-up voltage Vchp that exceeds the minimum necessary voltage level will result in a power loss if supplied to the output voltage generation circuit 200. In the present invention, the step-up voltage Vchp is automatically controlled to become the minimum voltage necessary for the output voltage generation circuit 200 to provide a required output voltage Vo.

The level of the output reference voltage Vor can be automatically corrected based on the temperature of a predetermined section of the IC chip, irrespective of the output voltage setting signal Svo. To do so, the temperature of the output voltage generation circuit 200 in the IC and/or the temperature of the LCD drive circuit 500 are/is detected by the output voltage generation circuit 200. The output_voltage setting circuit 210 can preferably correct the output reference voltage Vor based on the detected temperature(s).

There is provided a voltage comparison circuit 300 which has at least one comparator for comparing the detection voltage Vdet associated with the output voltage Vo with a given reference voltage to generate a comparison signal Scp. In the example shown herein, there are provided three comparators 310-330 generating three comparison signals Scp1-Scp3 (collectively referred to as comparison signal Scp). If comparators 310-330 have hysteresis characteristics, they are less likely to malfunction during switching of the step-up voltage.

The voltage comparison circuit 300 compares, in the respective comparators 310-330, a first through a third reference voltages Vref1-Vref3 generated by a the reference voltage generation circuit 340 (with their magnitudes being Vref1>Vref2>Vref3) with the detection voltage Vdet that is obtained by dividing the output voltage Vo by a resistor 230 having a resistance R1 and a resistor 240 having a resistance R2 to generate a first through a third comparison signals Scp1-Scp3.

A switchable control circuit 400 changes the number of the operable stages of the CHP step-up circuit 100 based on the first through the third comparison signals Scp1-Scp3. The number of the operable stages (CHP units) is controlled by the first through the third comparison signals Scp1-Scp3 adapted to stop one or more of the CHP stages (CHP units) of the CHP step-up circuit 100 in sequence beginning with the first stage CHP unit so as to generate a step-up voltage Vchp necessary for the output voltage generation circuit 200 to generate a required step-up voltage Vo.

Specifically, the switchable control circuit 400 is supplied with a clock CLK suitable for CHP operation of the CHP step-up circuit 100, together with the first through the third comparison signals Scp1-Scp3. Those CHP units that are to be operated are supplied with CHP control signals Sc which vary between HIGH (H) level and LOW (L) level in synchronism with the clock CLK. On the other hand, those CHP units that are to be stopped are supplied with a CHP control signal Sc having a fixed voltage level (e.g. L level). In the example shown herein, the CHP control signals Sc include a first through a fourth CHP control signals Sc1-Sc4, respectively.

Referring to FIG. 2, there is shown a specific arrangement of the CHP step-up circuit 100. As seen in FIG. 2, the CHP step-up circuit 100 includes a first through a third CHP units 110, 120, and 130, respectively, and a smoothing unit 140, all connected in cascade connection so that the power supply voltage Vcc is stepped up in sequence to a required step-up voltage Vchp in accordance with the first through the fourth CHP control signals Sc1-Sc4.

The first stage CHP unit 110 includes: a first switching circuit 112 provided between the input end of the unit 110 receiving the power supply voltage Vcc and the output end of the unit; a flying capacitor 111 connected to the output end of the unit 110; and a change-over switching circuit 113 having a first end A connected to a reference node (e.g. ground), a second end B connected to a power supply node (of voltage Vcc) and a common end C connected to the other end of the flying capacitor 111, the change-over switching circuit 113 controlled by the same first CHP control signal Sc1 as controlling the first switching circuit 112.

The second CHP unit 120 includes: a first switching circuit 122 provided between the input end thereof connected to the output end of the first CHP unit 110 and the output end of the unit 120; a flying capacitor 121 connected at one end thereof to the output end of the unit 120, and a change-over switching circuit 123 having a first end A connected to the ground, a second end B connected to the power supply node, and a common end C connected to the other end of the flying capacitor 121, the change-over switching circuit 123 controlled by the same second CHP control signal Sc2 as controlling the first switching circuit 122.

The third CHP unit 130, serving as the last stage, includes: a first switching circuit 132 provided between the input end of the unit 130 which is connected to output end of the second CHP unit 120 and the output end of the unit 130; a flying capacitor 131 connected to the output end of the unit 130; and a change-over switching circuit 133 having a first end A connected to the ground, a second end B connected to the power supply node, and a common end C connected to the other end of the flying capacitor 131, the change-over switching circuit 133 controlled by the same third CHP control signal Sc3 as controlling the first switching circuit 132.

The smoothing unit 140 is provided between the input end of the unit 140 which is connected to the output end of the third CHP unit 130 and the output end of the CHP step-up circuit 100, and is provided with a first switching circuit 142 controlled by the fourth CHP control signal Sc4 and a smoothing capacitor 141 connected at one end thereof to the output end of the CHP step-up circuit 100 and at the other end thereof to the ground. The step-up voltage Vchp is outputted from the output end of this smoothing unit 140.

In this CHP step-up circuit 100, each of the first switching circuits 112-142 and the change-over switching circuits 113-133 may be a semiconductor switch such as a MOS transistor and a bipolar transistor.

Alternatively, each of the first switching circuits 112-142 may be replaced by a diode or a transistor having diode connection. However, in order to reduce voltage drops across the respective CHP units 110-130 and the smoothing unit 140, the first switching circuits 112-142 are preferable to semiconductor switches.

Referring further to the timing diagram shown in FIG. 3, operation of the power supply circuit of the invention will now be described.

First, when the output voltage Vo is set by the output voltage setting signal Svo in a first voltage range, the detection voltage Vdet is higher than the first reference voltage Vref1, so that the first through the third comparison signals Scp1-Scp3 are all at H level.

Thus, the switchable control circuit 400 supplies the first and the third CHP control signals Sc1 and Sc3, respectively, to the odd numbered (i.e. first and third) CHP units 110 and 130 in phase with the clock CLK, and supplies the second CHP control signal Sc2 to the even numbered (i.e. second) CHP unit 120 in opposite phase to the clock CLK. The smoothing unit 140 is supplied with the fourth CHP control signal Sc4 in the opposite phase to the third CHP control signal Sc3 supplied to the third CHP unit 130 in the last stage. The smoothing unit 140 may be adapted to sustain the same operation irrespective of the range of the operating voltage.

When the output voltage Vo is in a first voltage range with all the CHP units 110-130 performing charge pump operation, the step-up voltage Vchp of the CHP step-up circuit 100 has the maximum level.

Next, when the output voltage Vo is set by the output voltage setting signal Svo to be in a second voltage range, the detection voltage Vdet is between the first reference voltage Vref1 and the second reference voltage Vref2. Thus, the first comparison signal Scp1 has L level, while the second and the third comparison signals Scp2 and Scp3, respectively, have H level.

As a consequence, the first CHP control signal Sc1 supplied from the switchable control circuit 400 to the first CHP unit 110 has L level, which causes the charge pump operation of the first CHP unit 110 to be stopped. Under this condition, the first switching circuit 112 turns on to connect the first end A of the change-over switching circuit 113 to the ground. Hence, the power supply voltage Vcc is outputted from the output end of the first CHP unit 110 via the first switching circuit 112.

On the other hand, the second CHP control signal Sc2 is supplied to the second CHP unit 120 in opposite phase to the lock CLK, while the third CHP control signal Sc3 is supplied to the third CHP unit 130 in phase with the lock CLK. Thus, when the output voltage Vo is in the second voltage range, the first CHP unit 110 is stopped, while the second and the third CHP units 120 and 130, respectively, are in charge pump operation. As a result, the step-up voltage Vchp stepped up from the power supply voltage Vcc in two stages of the CHP units 120 and 130 is outputted from the CHP step-up circuit 100.

When the output voltage setting signal Svo is changed to provide an output voltage Vo in a third voltage range, the detection voltage Vdet has a level between the second and the third reference voltages Vref2 and Vref3, respectively. As a consequence, the first and the second comparison signals Scp1 and Scp2, respectively, have L level, and the third comparison signal Scp3 has H level.

Thus, the first and the second CHP control signal Sc1 and Sc2, respectively, supplied from the switchable control circuit 400 to the first and the second CHP units 110 and 120, respectively have L level. When the first and the second CHP control signals Sc1 and Sc2, respectively, have L level, the first and the second CHP units 110 and 120, respectively, stop their charge pump operation. Under this condition, the first switching circuits 112 and 122 turn on, thereby connecting the first ends A of the change-over switching circuits 113 and 123 to the ground. As a consequence, the power supply voltage Vcc is outputted from the output end of the second CHP unit 120 via the first switching circuits 112 and 122.

On the other hand, the third CHP control signal Sc3 is supplied to the third CHP unit 130 in phase with the clock CLK. Thus, when the output voltage Vo is in the third voltage range, the first and the second CHP units 110 and 120, respectively, are stopped, and only the third CHP unit 130 performs charge pump operation. As a result, the step-up voltage Vchp stepped up from the power supply voltage Vcc by the first stage CHP unit 130 is outputted from the CHP step-up circuit 100.

When the output voltage setting signal Svo is set to provide the output voltage Vo in the fourth voltage range, the detection voltage Vdet has a lower level than the third reference voltage Vref3. As a consequence, all of the first through the third comparison signals Scp1-Scp3 have L level.

Thus, the switchable control circuit 400 provides the respective first through third CHP units 110-130 with the first through the third CHP control signals Sc1-Sc3 at L level. When the first through the third CHP control signals Sc1-Sc3 have L level, the charge pump operations of the first through the third CHP units 110-130 are stopped. Under this condition, the first switching circuits 112, 122, and 132 turn on, connecting the first ends A of the respective change-over switching circuits 113, 123, and 133 to the ground. As a result, the power supply voltage Vcc is outputted from the output end of the third CHP unit 130 via the first switching circuits 112, 122, and 132.

In a fourth voltage range of the output voltage, all the CHP units 110-130 are stopped, thereby outputting the power supply voltage Vcc from the respective first switching circuits 112-142. In this case, the fourth CHP control signal Sc4 may be also provided at L level to turn on the first switching circuit 142.

Although it has been described above that the output voltage Vo is switched over from the first to the fourth levels in sequence, it will be apparent that the output voltage Vo can be changed from one level to another in any arbitrary order.

In this manner, the invention generates an output voltage Vo as prescribed by an output voltage setting signal Svo by converting the step-up voltage Vchp of the CHP step-up circuit 100 to the output voltage Vo by the output voltage generation circuit 200, and supplies the output voltage Vo to a load such as an LCD drive circuit 500 that requires different driving voltages while automatically controlling the level of the step-up voltage Vchp to provide the required output voltage Vo. To do this, the output voltage generation circuit 200 is supplied with a step-up voltage Vchp having an automatically optimized level. Thus, the output generation circuit has a reduced electric power loss and an improved efficiency.

It is noted that it is only necessary to provide the output voltage generation circuit 200 with an output voltage setting signal Svo instructing the required output voltage Vo. Since CHP unit(s) to be stopped can be automatically selected, the switching loss of power in the CHP step-up circuit is reduced and its efficiency is improved.

An external controller such as a CPU for controlling the power supply circuit of the invention is only required to provide an output voltage setting signal for the voltage then required by the load circuit such as a LCD drive circuit, so that the burden of controlling the power supply circuit imposed on the controller is alleviated. Thus, much of the control capability of the external controller (e.g. CPU) can be diverted to other purposes.

As described above, a certain number of the CHP units are stopped in sequence starting from the first stage, according to the required level of the output voltage Vo. Alternatively, in controlling the step-up voltage Vchp, the switchable control circuit 400 may be adapted to stop the multiple CHP units in sequence starting from the last stage in response to a comparison signal. This can be easily done by simply modifying the control logic controlling the switchable control circuit 400.

Although it has been descried above that the CHP units of the step-up circuit 100 are individually controllable, they may be controlled simultaneously in multiple units.

Although only one power supply circuit is shown in FIG. 1, there can be provided more than one power supply circuits, thereby making it possible to supply different multiple output voltages simultaneously to a load circuit (e.g. LCD drive circuit).

Figure 4:
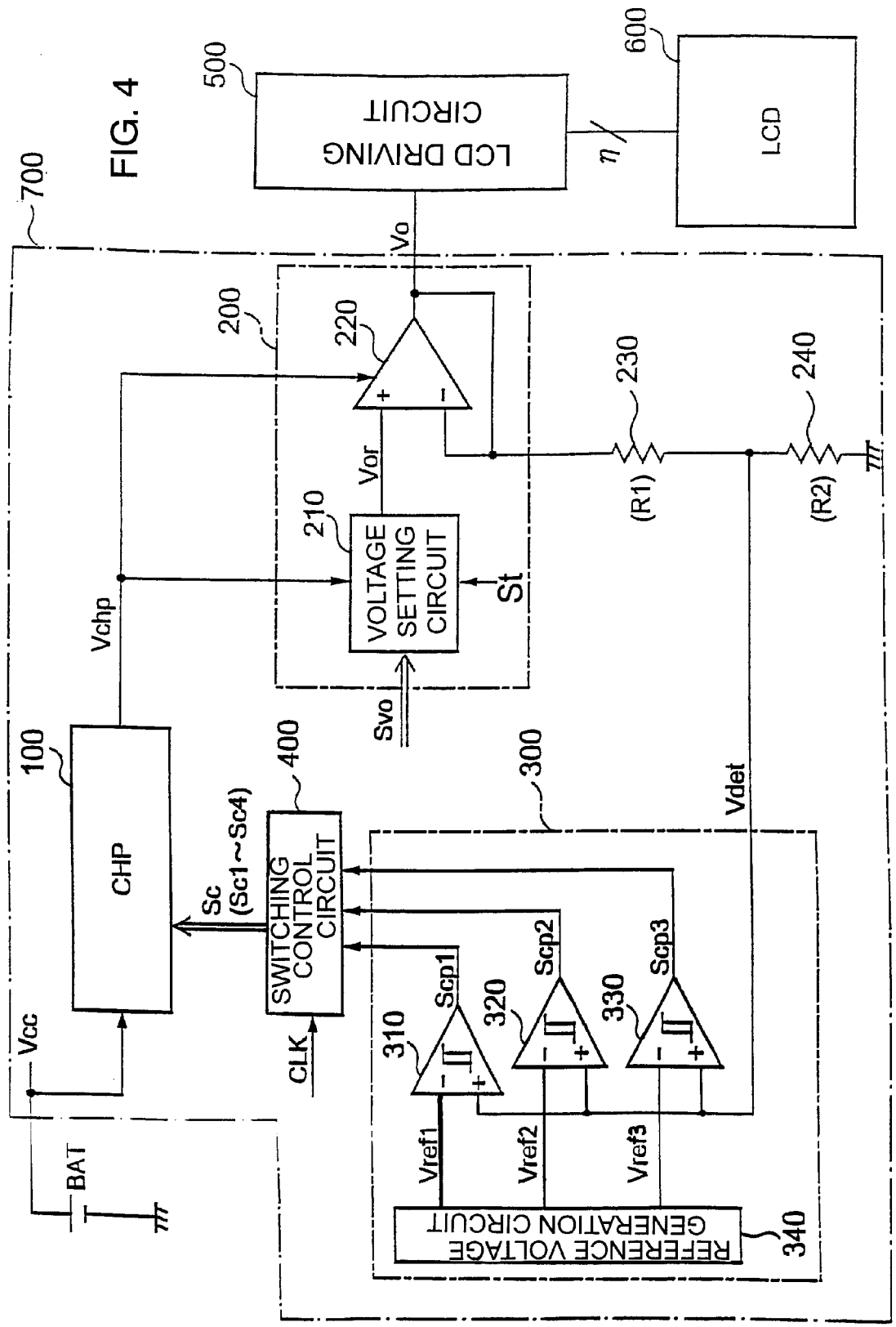
FIG. 4 shows arrangements of a power supply circuit utilizing a CHP step-up circuit and a portable device equipped with a liquid crystal display (LCD) in accordance with another embodiment of the invention.

Referring to FIG. 4, there is shown an arrangement of a power supply circuit utilizing a CHP step-up circuit in accordance with another embodiment of the invention, along with a portable device equipped with an LCD. The arrangement shown in FIG. 4 differs from that of FIG. 1 in that the output voltage setting circuit 210 of FIG. 4 is supplied with a temperature signal St separately from the output voltage setting signal Svo. This temperature signal St may depend on the temperatures of the LCD drive circuit 500, the LCD panel 600, and a predetermined section of the power supply circuit 700. Thus, the output voltage setting circuit 210 corrects the output voltage setting signal Svo based on the temperature signal St to output a correct output reference voltage Vor.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

The power supply circuit of the invention has an output voltage generation circuit for converting a step-up voltage to a required output voltage, the level of the step-up voltage being controllable in accordance with the level of the required output voltage. In addition, the power supply circuit can exercise a fine control over the output voltage in response to a control signal. Utilizing an inventive power supply circuit, it is possible to provide a portable device that is legible and usable for a long time.

The invention claimed is:

1. A power supply circuit, comprising:
   a charge pump (CHP) type step-up circuit having multiple stages of CHP units including a first through a last CHP units and adapted to step up an inputted power supply voltage to a higher step-up voltage;
   an output voltage generation circuit for converting said step-up voltage into a required output voltage based on an output voltage setting signal;
   a voltage comparison circuit having at least one comparator for comparing the detection voltage associated with said output voltage with a reference voltage to generate a comparison signal; and
   a switchable control circuit for controlling the number of operable stages of said CHP type step-up circuit based on said comparison signal; wherein said output voltage generation circuit has:
      an output voltage setting circuit, operable at said step-up voltage, for generating an output reference voltage in accordance with said output voltage setting signal; and
      a buffer amplifier, operable at said step-up voltage, for amplifying said output reference voltage to said output voltage.

2. The power supply circuit according to claim 1, wherein said switchable control circuit is capable of stopping one or more of said multiple CHP units in sequence starting from said first CHP unit in accordance with said comparison signal to thereby control said step-up voltage.

3. The power supply circuit according to claim 1, wherein said switchable control circuit is capable of stopping one or more of said multiple CHP units in sequence starting from the last CHP unit in accordance with said comparison signal to thereby control said step-up voltage.

4. The power supply circuit according to claim 1, wherein said power supply circuit is formed in an IC chip; and
   said output voltage setting circuit is adapted to correct said output reference voltage in response to the output voltage setting signal that depends on the temperature of said IC chip.

5. The power supply circuit according to claim 1, wherein said power supply circuit is formed in an IC chip; and
   said output voltage setting signal is corrected according to the temperature of said IC chip and/or the temperature of the display driven by the driving voltage associated with said output voltage.

6. The power supply circuit according to claim 1, wherein said power supply circuit is formed in an IC chip; and
   said output voltage setting circuit receives a temperature signal associated with the temperature of said IC chip and/or the temperature of the load connected, and outputs an output reference voltage obtained by correcting said output voltage setting signal based on said temperature signal.

7. The power supply circuit according to claim 1, wherein each of said CHP units has:
   a first switching circuit provided between the input and the output ends of the unit;
   a flying capacitor connected at one end thereof to said output end; and
   a change-over switching circuit having a first end connected to a node of a reference voltage, a second end connected to a node of said power supply voltage, and a common end connected to the other end of said flying capacitor, said change-over switching circuit controlled by the same CHP control signal as controlling said first switching circuit.

8. The power supply circuit according to claim 7, wherein said switchable control circuit is supplied with said comparison signal and a clock, provides a CHP control signal that varies in synchronism with said clock to those CHP units to be operated and another CHP control signal having a predetermined level to those CHP units to be stopped.

9. A portable device, comprising:
   a battery power supply;
   a power supply circuit in accordance with claim 1 supplied with the power supply voltage of said battery power source; and
   a load circuit receiving the output voltage of said power supply circuit.

10. The portable device according to claim 9, wherein said load circuit is an LCD.

11. A power supply circuit, comprising:
    a step-up circuit adapted to step up an inputted power supply voltage to a higher step-up voltage;
    an output voltage generation circuit for converting said step-up voltage into a required output voltage based on an output voltage setting signal;
    a voltage comparison circuit having at least one comparator for comparing a detection voltage associated with said output voltage with a reference voltage to generate a comparison signal; and
    a control circuit for controlling said step-up circuit based on said comparison signal, wherein
    said output voltage generation circuit has an output voltage setting circuit, operable at said step-up voltage, for generating an output reference voltage in accordance with said output voltage setting signal and a buffer amplifier, operable at said step-up voltage, for amplifying said output reference voltage to said output voltage.

12. The power supply circuit according to claim 11, wherein said power supply circuit is formed in an IC chip; and
    said output voltage setting circuit is adapted to correct said output reference voltage in response to the output voltage setting signal that depends on the temperature of said IC chip.

13. The power supply circuit according to claim 11, wherein said power supply circuit is formed in an IC chip; and
    said output voltage setting circuit receives a temperature signal associated with the temperature of said IC chip and/or the temperature of the load connected, and outputs an output reference voltage obtained by correcting said output voltage setting signal based on said temperature signal.

14. A portable device, comprising:
    a battery power supply;
    a power supply circuit in accordance with claim 12 supplied with the power supply voltage of said battery power source; and
    a load circuit receiving the output voltage of said power supply circuit.

15. The portable device according to claim 14, wherein said load circuit is an LCD.

16. The power supply circuit according to claim 11, wherein said control circuit is arranged to control said step-up circuit for lowering the step-up voltage with the detection voltage lowered.

17. The power supply circuit according to claim 11, wherein the detection voltage depends on the temperature of a load supplied with the required output voltage.

* * * * *